United States Patent [19]
Dvorkis et al.

[11] Patent Number: 5,923,021
[45] Date of Patent: Jul. 13, 1999

[54] LIGHT COLLECTION SYSTEMS IN ELECTRO-OPTICAL READERS

[75] Inventors: Paul Dvorkis, Stony Brook; Daniel R. McGlynn, Brooklyn; Edward Barkan; William Snyder, both of Miller Place; David Goren, Ronkonkoma; Gregg Marwin, Douglaston, all of N.Y.

[73] Assignee: Symbol Technologies, Inc., Holtsville, N.Y.

[21] Appl. No.: 09/131,303

[22] Filed: Aug. 10, 1998

Related U.S. Application Data

[62] Division of application No. 08/491,813, Jun. 19, 1995, abandoned.

[51] Int. Cl.$^6$ ..................................................... G06K 7/10
[52] U.S. Cl. ..................................... 235/455; 235/462.06
[58] Field of Search ............................. 235/455, 462.06, 235/462.01; 250/208.6

[56] References Cited

U.S. PATENT DOCUMENTS

| | | | |
|---|---|---|---|
| 3,443,072 | 5/1969 | Mori | 235/462.06 |
| 4,724,307 | 2/1988 | Dutton et al. | 235/455 |
| 4,734,566 | 3/1988 | Senda et al. | 235/455 |
| 4,893,025 | 1/1990 | Lee | 250/208.6 |
| 5,200,597 | 4/1993 | Eastman et al. | 235/455 |
| 5,202,784 | 4/1993 | Reddersen | 235/462.36 |
| 5,585,615 | 12/1996 | Iwanami et al. | 235/462.06 |
| 5,600,116 | 2/1997 | Seo et al. | 235/455 |

*Primary Examiner*—Donald Hajec
*Assistant Examiner*—Mark Tremblay
*Attorney, Agent, or Firm*—Kirschstein, et al.

[57] ABSTRACT

An optical scanner for reading indicia of variable light reflectivity, such as bar code symbols, having a light source for producing a light beam for scanning a target; a sensor for collecting the reflected light from the target; and various light collection systems, including a louver formed from an array of thin slats positioned adjacent to the sensor so that light directed along substantially only one angle reaches the sensor, as well as imaging/diffusing optical systems.

20 Claims, 9 Drawing Sheets

LIGHT COLLECTION SYSTEMS IN ELECTRO-OPTICAL READERS

This application is a division of pending U.S. patent application Ser. No. 08/491,813, filed Jun. 19, 1995, now abandoned.

REFERENCE TO RELATED APPLICATIONS

This application is related to U.S. patent application Ser. No. 08/377,998 filed Jan. 25, 1995, now U.S. Pat. No. 5,532,469 which is a continuation of application Ser. No. 093,967, filed Jul. 21, 1993 (now U.S. Pat. No. 5,396,055), which was a division of application Ser. No. 895,277 filed Jun. 8, 1992 (now U.S. Pat. No. 5,262,628), which was a division of application Ser. No. 272,545 filed Nov. 17, 1988 (now U.S. Pat. No. 5,130,520), which was a division of application Ser. No. 148,555, filed Jan. 26, 1988 (now U.S. Pat. No. 4,845,350), which was a division of application Ser. No. 883,923, filed Jul. 10, 1986 (now U.S. Pat. No. 4,758,717), which was a division of application Ser. No. 519,523, filed Aug. 1, 1983 (now U.S. Pat. No. 4,673,805), which was a division of application Ser. No. 342,231, filed Jan. 25, 1982 (now U.S. Pat. No. 4,409,470).

BACKGROUND OF THE INVENTION

1. Field of the Invention

This invention generally relates to an apparatus for and a method of electro-optically reading indicia having parts of different light reflectivity, for example, bar code or matrix array symbols, and, more particularly, to controlling the viewing angle of, or the light input to, photodetectors used in such apparatus for sensing light reflected from such indicia.

2. Description of the Related Art

Various optical readers and optical scanning systems have been developed heretofore for reading indicia such as bar code symbols appearing on a label or on the surface of an article. The bar code symbol itself is a coded pattern of indicia comprised of a series of bars of various widths spaced apart from one another to bound spaces of various widths, the bars and spaces having different light reflecting characteristics. The readers in scanning systems electro-optically transform the graphic indicia into electrical signals, which are decoded into alphanumeric characters that are intended to be descriptive of the article or some characteristic thereof. Such characteristics are typically represented in digital form and utilized as an input to a data processing system for applications in point-of-sale processing, inventory control and the like. Scanning systems of this general type have been disclosed, for example, in U.S. Pat. Nos. 4,251,798; 4,369,361; 4,387,297; 4,409,470; 4,760,248; 4,896,026, all of which have been assigned to the same assignee as the instant application. As disclosed in some of the above patents, one embodiment of such a scanning system resides, inter alia, in a handheld, portable laser scanning device supported by a user, which is configured to allow the user to aim the scanning head of the device, and more particularly, a light beam, at a targeted symbol to be read.

The light source in a laser scanner bar code reader is typically a gas laser or semiconductor laser. The use of semiconductor devices as the light source is especially desirable because of their small size, low cost and low voltage requirements. The laser beam is optically modified, typically by an optical assembly, to form a beam spot of a certain size at the target distance. It is preferred that the cross section of the beam spot at the target distance be approximately the same as the minimum width between regions of different light reflectivity, i.e., the bars and spaces of the symbol. At least one bar code reader has been proposed with two light sources to produce two light beams of different frequency.

The bar code symbols are formed from bars or elements typically rectangular in shape with a variety of possible widths. The specific arrangement of elements defines the character represented according to a set of rules and definitions specified by the code or "symbology" used. The relative size of the bars and spaces is determined by the type of coding used as is the actual size of the bars and spaces. The number of characters (represented by the bar code symbol) is referred to-as the density of the symbol. To encode the desired sequence of the characters, a collection of element arrangements are concatenated together to form the complete bar code symbol, with each character of the message being represented by its own corresponding group of elements. In some symbologies, a unique "start" and "stop" character is used to indicate when the bar code begins and ends. A number of different bar code symbologies exist, these symbologies include UPC/EAN, Code 39, Code 128, Codeabar, and Interleaved 2 of 5, etc.

In order to increase the amount of data that can be represented or stored on a given amount of surface area, several new bar code symbologies have recently been developed. One of these new code standards, Code 49, introduces a "two dimensional" concept by stacking rows of characters vertically instead of extending the bars horizontally. That is, there are several rows of bar and space patterns, instead of only one row. The structure of Code 49 is described in U.S. Pat. No. 4,794,239, which is herein incorporated by reference. Another two-dimensional symbology, known as "PDF417", is described in U.S. patent application, Ser. No. 07/461,881, now U.S. Pat. No. 5,304,786.

Still other symbologies have been developed in which the symbol is comprised of a matrix array made up of hexagonal, square, polygonal and/or other geometric shapes. Such symbols are further described in, for example, U.S. Pat. Nos. 5,276,315 and 4,794,239. Such matrix symbols may include Vericode, Datacode, and MAXICODE.

In the laser beam scanning systems known in the art, the laser light beam is directed by a lens or other optical components along the light path toward a target that includes a bar code symbol on the surface. The moving-beam scanner operates by repetitively scanning the light beam in a line or series of lines across the symbol by means of motion of a scanning component, such as the light source itself or a mirror disposed in the path of the light beam. The scanning component may either sweep the beam spot across the symbol and trace a scan line across the pattern of the symbol, or scan the field of view of the scanner, or do both.

In retroreflective light collection, a single optical component, e.g., a rotating mirror, as described in Krichever et al. U.S. Pat. No. 4,816,661 or Shepard et al. U.S. Pat. No. 4,409,470, both herein incorporated by reference, scans the beam across a target surface and directs the collected light to a detector. The rotating mirror must be relatively large to receive the incoming light, but only a small detector is required because the rotating mirror can focus the light on to a small area. As a result, the detector has a relatively small field of view, which increases signal-to-noise ratio.

In non-retroreflective light collection, the reflected laser light is not collected by the same rotating mirror used for scanning. Instead the detector is constructed to have a large field of view so that the reflected laser light traces across the surface of the detector. Because the rotating mirror need only handle the outgoing light beam, it can be made much smaller. But the detector must be relatively large in order to receive the incoming light beam from all scanned locations.

Bar code reading systems also include a sensor or photo-detector which detects light reflected or scattered from the symbol. The photo-detector or sensor is positioned in the scanner in an optical path so that it has a field of view which ensures the capture of a portion of the light which is reflected or scattered off the symbol. The captured light is detected and converted into an electrical signal. Electronic circuitry and software decode the electrical signal into a digital representation of the data represented by the symbol that has been scanned. For example, the analog electrical signal generated by the photodetector is converted by a digitizer into a pulse width modulated digitized signal, with the widths corresponding to-the physical widths of the bars and spaces. Such a digitized signal is then decoded, based on the specific symbology used by the symbol, into a binary representation of the data encoded in the symbol, and subsequently to the alphanumeric characters so represented.

The decoding process of known bar code reading system usually works in the following way. The decoder receives the pulse width modulated digitized signal from the digitizer, and an algorithm, implemented in the software, attempts to decode the scan. If the start and stop characters and the characters between them in the scan were decoded successfully and completely, the decoding process terminates and an indicator of a successful read (such as a green light and/or an audible beep) is provided to the user. Otherwise, the decoder receives the next scan, performs another decode attempt on that scan, and so on, until a completely decoded scan is achieved or no more scans are available.

Such a signal is then decoded according to the specific symbology into a binary representation of the data encoded in the symbol, and to the alphanumeric characters so represented.

Moving-beam laser scanners are not the only type of optical instrument capable of reading bar code symbols. Another type of bar code reader is one which incorporates detectors based on charge coupled device (CCD) technology. In such prior art readers the sides of the detector are typically smaller than the symbol to be read because of the image reduction by the objective lens in front of the CCD. The entire symbol is flooded with light from a light source such as lighting light emitting diodes (LED) in the scanning device, and each CCD cell is sequentially read out to determine the presence of a bar or a space.

The working range of CCD bar code scanners is rather limited as compared to laser based scanners and is especially low for CCD based scanners with an LED illumination source. Other features of CCD based bar code scanners are set forth in U.S. patent application Ser. No. 08/041,281 which is hereby incorporated by reference, and in U.S. Pat. No. 5,210,398. These references are illustrative of the earlier technological techniques proposed for use in CCD type scanners to acquire and read indicia in which information is arranged in a two dimensional pattern.

SUMMARY OF THE INVENTION

OBJECTS OF THE INVENTION

It is a general object of the present invention to provide an improved indicia scanner capable of operation in high ambient light conditions.

It is another object of the invention to provide a non-retroreflective bar code reader with lower noise amplification.

It is a further object of the present invention to provide a scanner for reading bar codes with a narrow asymmetric field of view with a staring detector.

It is a still further object of the present invention to provide an indicia scanner capable of optical signal enhancement in the scanning direction.

It is yet another object of the invention to provide a hand-held indicia reader that is capable of automatically aligning the scan path of a scanning line with a direction orthogonal to the bar elements of the bar code symbol.

It is also an object of the invention to provide a high speed indicia reader capable of operation with a small detector area.

It is an even flier object of the invention to provide a method which can be used to accomplish one or more of the above objectives Additional objects, advantages and novel features of the present invention will become apparent to those skilled in the art from this disclosure, including the following detailed description, as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of significant utility.

FEATURES OF THE INVENTION

In keeping with these objects, and others which will become apparent hereinafter, one feature of this invention resides, briefly stated, in an optical reader for reading indicia having parts of different light reflectivity, e.g. bar code symbols having alternating bars and spaces or matrix array symbols, with a small area detector.

It is yet another feature of the invention to provide a non-retroreflective system for reading bar code symbols or the like with a louvered or diffusing light collection system.

The novel features and characteristics of the invention are set forth in the appended claims. The invention itself, however, as well as other features and advantages thereof, will be best understood by reference to a detailed description of a specific embodiment, when read in conjunction with the accompanying drawings.

DETAILED DESCRIPTION OF THE PREFERRED EMBODIMENTS

The invention relates to bar code readers of the type generally described in the above identified patents and patent applications for reading bar code symbols. As used in this specification and the claims, the term "bar code symbol" is intended to be broadly construed and to cover not only symbol patterns composed of alternating bars and spaces, but also other graphic patterns, such as dot or matrix array patterns, as well as alpha-numeric characters and, in short, any indicia having portions of different light reflectivity.

Figure 1A:
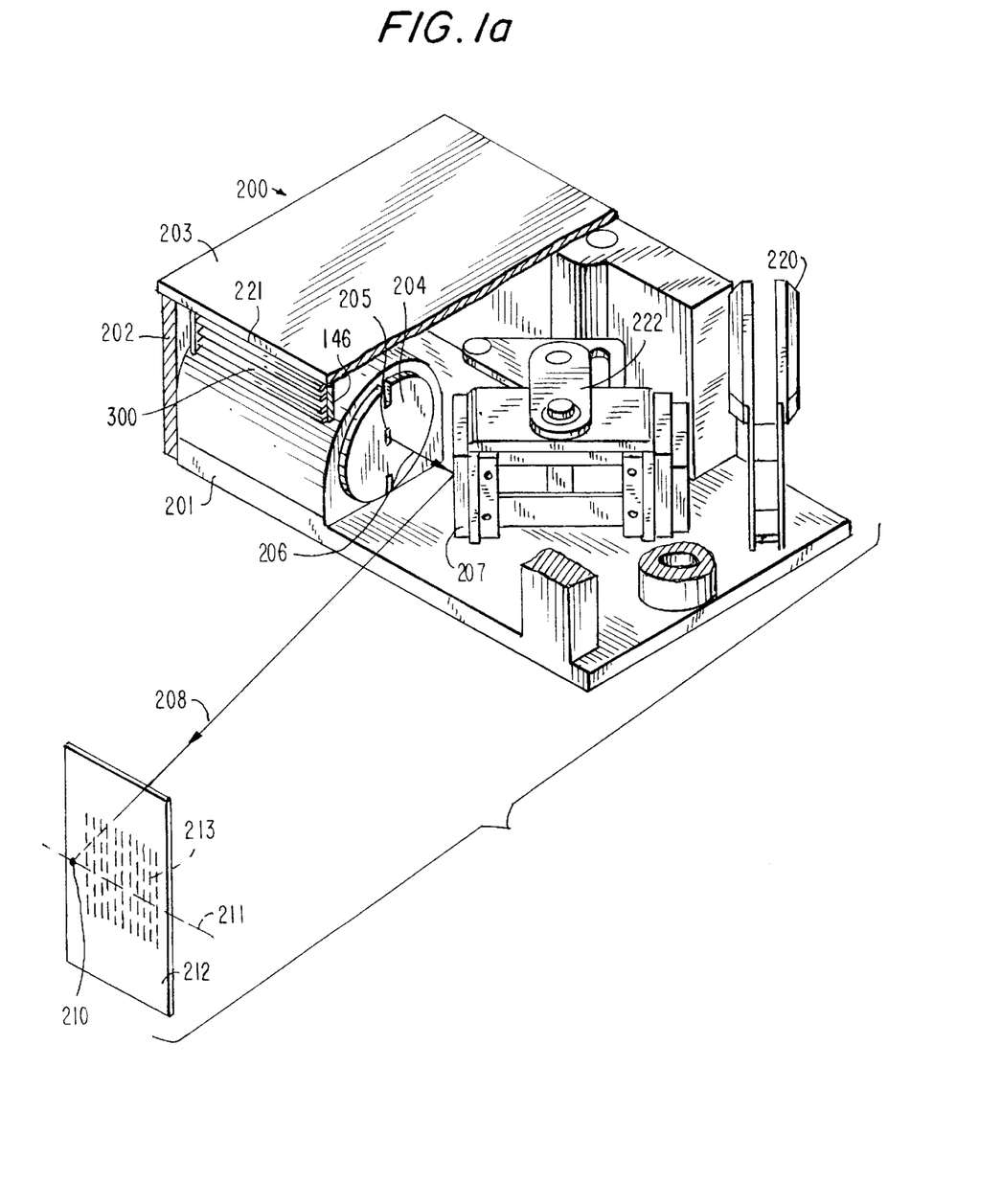
FIG. 1a is a cut-away perspective view of a module for bar code reading according to the present invention.

As a preferred embodiment, we describe the implementation of the present invention in a laser-scanning, bar code reader unit such as illustrated in FIG. 1a. This modular device of FIG. 1a is generally of the style disclosed in U.S. Pat. No. 5,367,151, issued to Dvorkis et al., assigned to Symbol Technologies, Inc. and hereby incorporated by reference, and is also similar to the configuration of a bar code reader commercially available as part number SE 1000 from Symbol Technologies, Inc. Alternatively, or in addition, features of U.S. Pat. Nos. 4,387,297, and 4,760,248 issued to Swartz et al., or U.S. Pat. No. 4,409,470 issued to Shepard et al., both such patents assigned to Symbol Technologies, Inc., may be employed in constructing the bar code reader unit of FIG. 1a. These U.S. Pat. Nos. 4,760,248, 4,387,297 and 4,409,470 are incorporated herein by reference.

The subassembly or device of FIG. 1a may be implemented in any type of bar code reader, fixed or portable. As an example, the device is preferably implemented in a hand-held portable scanning head of the type shown in FIG. 1b.

The module 200 shown in FIG. 1a is formed from an integral frame or assembly 201 which is generally a rectangular parallelepiped in shape, having side walls 202 bounding an open top covered and enclosed by a printed circuit board 203 on which electrical components may be mounted. A laser diode assembly 204 is mounted on the assembly 201 for producing a light beam 206, which is emitted through aperture 205 in the laser diode assembly. The light beam 206 impinges on a mirror 207 from which the beam 206 is reflected along path 208. The mirror 207 directs the beam exteriorly of the module 200 in the direction of a target 212. The beam 208 forms a spot 210 on the target plane 212; when the mirror 207 is moved, the spot 210 moves along a line 211 (shown by a dotted line), which scans across a bar code symbol 213. Light is scattered or reflected from the symbol 213 to and through a transmissive detector window 221, behind which is an elongated, generally planar photodetector 146. FIG. 1a also depicts a drive coil 220 and moving mirror assembly 222 which supports the mirror 207 and moves in response to electrical current changes in the drive coil 220.

Figure 1B:
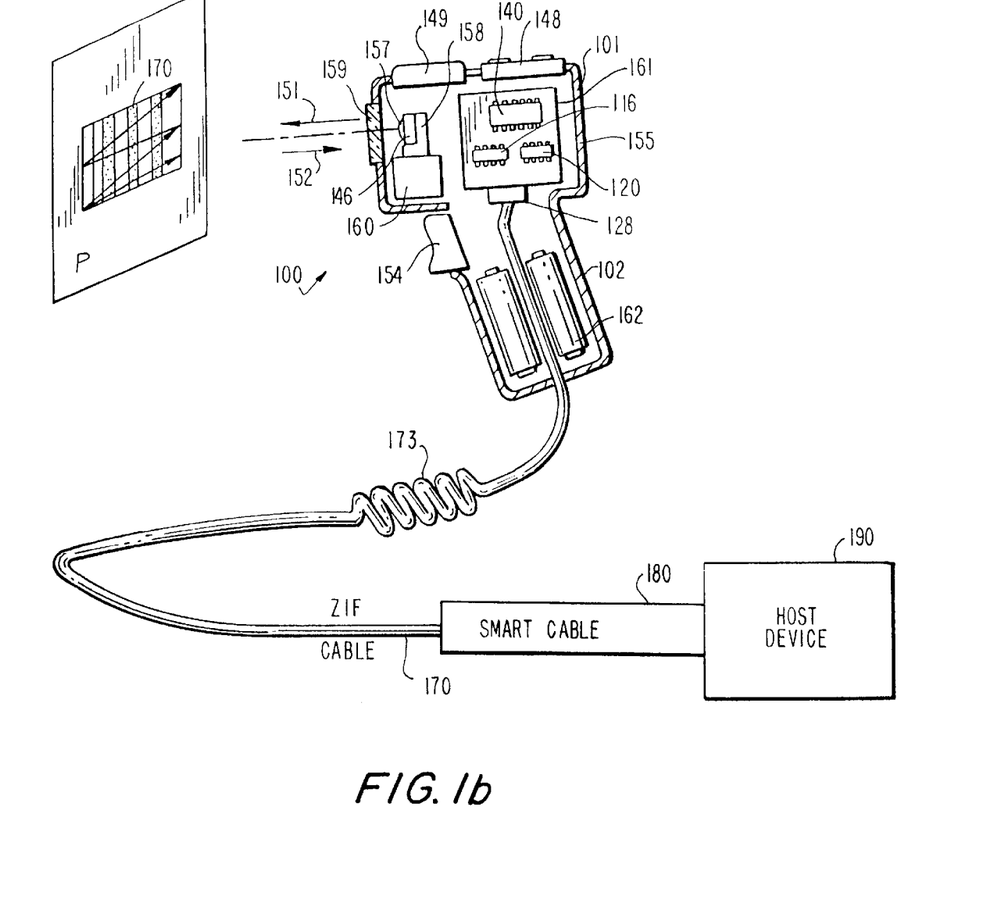
FIG. 1b is a highly simplified plan view of a portable bar code reader in which the module of FIG. 1a may be implemented.

Referring now to FIG. 1b, reference numeral 100 generally identifies a hand-held, gun-shaped, retro-reflective scanner head having a barrel 101 and a pistol-grip handle 102. A manually-operable trigger 154 is situated below the barrel 101 on an upper, forwardly-facing part of the handle 102. As known from the above-identified patents incorporated by reference herein, a light source component, typically, but not necessarily, a laser diode is mounted in the module 200 which is disposed inside the head 100.

The operation of such a unit is described as follows: An outgoing light beam 151 is generated in the reader unit 100, by a laser diode 158 or the like. The beam is typically directed outwardly through a window 159 that faces the indicia, e.g. bar code symbols 170, located at a reference plane P spaced at a distance from the front of the head. The laser diode 158 is oscillated by scan component 160 and the outgoing beam 151 is scanned in a fixed linear pattern which produces a visible scan line on the symbol. The user positions or orients the hand-held unit so this scan line traverses all of the bars of the symbol to be read. Reflected light 152 from the symbol is detected by a light-responsive device or detector 146 in the reader unit, producing serial electrical signals to be processed for decoding the information contained in the bar code. The movable trigger 154 is employed to allow the user to activate the light beam 151 and detector circuitry only after the user has pointed the unit at the symbol to be read, thereby ensuring that the correct target is read if there is more than one target in the field of view, and also saving battery life if the unit is self-powered.

The reader unit 100 is designed to be aimed at a bar code symbol by the user from a position where the reader unit 100 is spaced from the symbol, i.e., not touching the symbol or moving across the symbol. Typically, this type of hand-held bar code reader is specified to operate in the range of perhaps several inches.

A light-weight plastic housing 155 contains the laser light source 158, the detector 146, optics and signal processing circuitry, and a central processing unit (CPU) 140 mounted on circuit board 161, as well as batteries 162. The light-transmissive window 159 in the front end of the housing 155 allows the outgoing light beam 151 to exit and the incoming reflected light 152 to enter. A display 149 and keyboard 148 are mounted on the housing.

As seen in FIG. 1b, a suitable lens 157 (or multiple lens system) may be used to collimate and focus the scanned beam onto the bar code symbol at the reference plane, and this same lens 157 may be used to focus the reflected light 152 onto the detector 146. The light source 158 is positioned to introduce the emitted light beam into the axis of the lens 157 by appropriate beam-shaping structure when the trigger 154 is pulled. If the light produced by the source 158 is not visible, an aiming visible light beam may be included in the unit to introduce the visible beam into the light path coaxially with the lens 157. The aiming light, if needed, produces a visible-light spot which is scanned just like the laser beam. The user may employ this visible light to aim the reader unit at the symbol before pulling the trigger 154 to activate the scanning.

As noted above, mounted within the head is a photodetector component, e.g. a photodiode 146, having a field of view, and operative for detecting reflected light returning through the window 159 along the return path 152 from the symbol. An optional optical filter may be mounted in front of the photodiode. The filter and the photodiode 146 are mounted in a tube having an aperture stop through which the reflected light passes en route to the photodiode. The reflected light either directly impinges on the photodiode, or first impinges on a collector or reflector which, in turn, reflects the impinging light directly to the photodiode.

The aperture stop in front of the detector is optional and is used to limit the field of view of the photodiode to a relatively small area around the laser spot formed by the light beam on the symbol. This helps to reject ambient light from reaching the photodiode. In moderate lighting conditions, the aperture stop can be eliminated.

The scanning component 160 mounted within the head 100 may be operative for simultaneously scanning the symbol and the field of view of the photodetector. The scanning component 160 includes an electrically operated drive, operative for oscillating the laser diode 158 and/or the detector 148, either in alternate circumferential directions, or rotated completely around an axis of rotation, or in other embodiments, the scanning component includes a reflector mounted on and driven by said drive.

The photodetector 146 generates an electrical analog signal indicative of the variable intensity of the reflected light. This analog signal is converted into a digitized signal by a digitizer circuit 116. This digitized signal is transferred to a decode module 120 located interiorly of the head 100 on the board 161, typically implemented by a microprocessor and associated software. The decode module decodes the digital signal into data represented by (encoded in) the symbol, representing such data in digital form, such as ASCII characters. According to the present invention, this digital data is then formatted into a communications packet according to a protocol procedure, and transmitted along an external cable 170, designated as a "ZIF" connection. An external host device 190, usually a computer, connected via a so-called "smart cable" 180 to the cable 170, serves mainly as a data store in which the data generated by the decode module is stored for subsequent processing. The smart cable 180 is an interface that enables the head to exchange data with the host device.

In use, each time a user wishes to have a symbol read, the user aims the head at the symbol and pulls the trigger 154 to initiate reading of the symbol. The symbol is repetitively scanned a plurality of times per second, e.g. 36 times per second. As soon as the symbol has been successfully decoded and read, the scanning action is automatically terminated, thereby enabling the scanner to be directed to the next symbol to be read in its respective turn.

The scanner need not comprise a hand-held head, but could be a fixed mount in which no trigger is used to initiate reading. A fixed mount scanner may run continuously or be controlled by an external signal to initiate reading, for example by an object sensor.

As previously noted, the module 200 of FIG. 1a can be installed within the housing 155 and replace the components 158, 157, 146 and 160. The board 203 would then serve to replace board 161.

Figure 2:
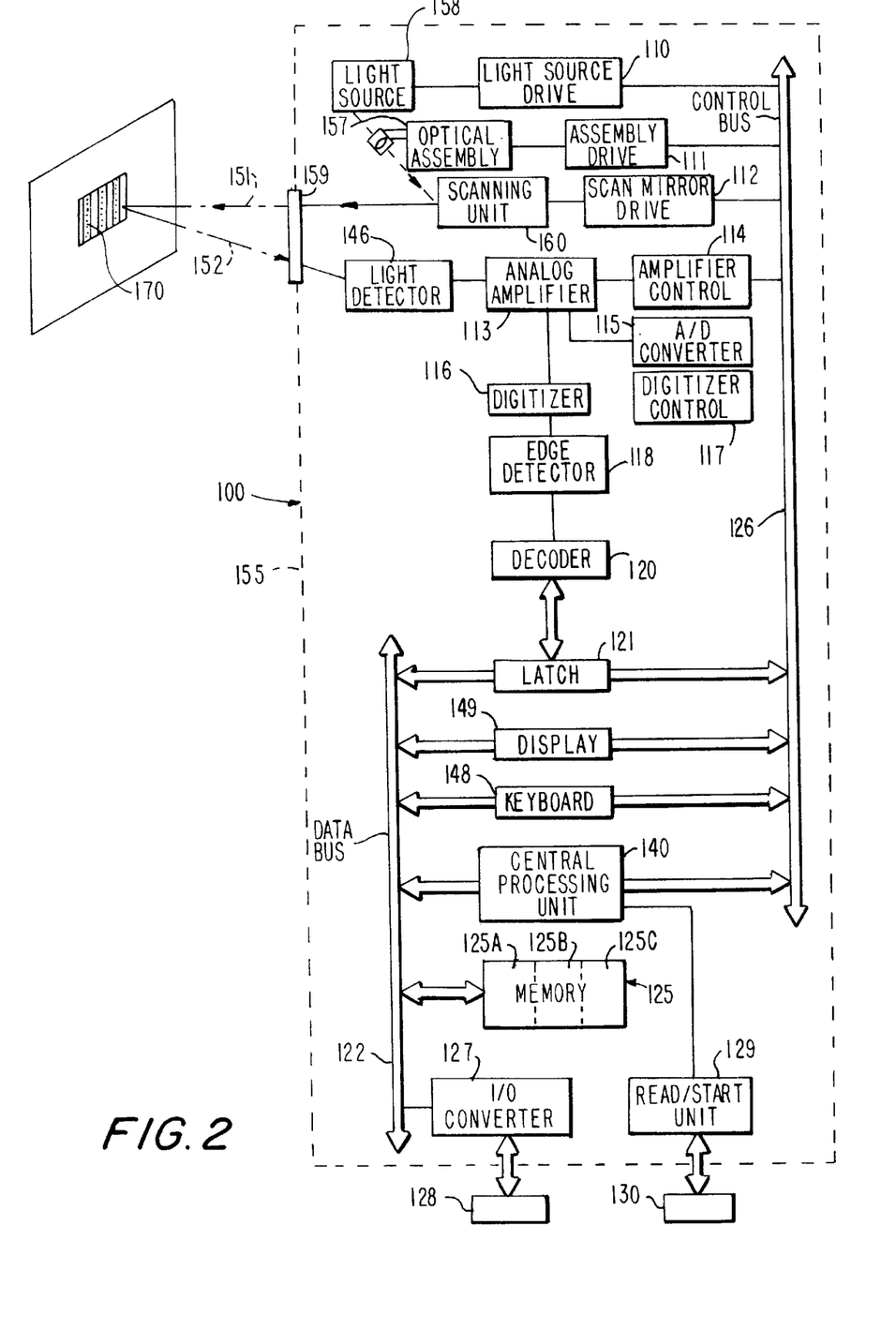
FIG. 2 is a highly simplified block diagrammatic representation of the bar code reader of FIG. 1b.

Turning to FIG. 2, there is shown a block diagram representation of the bar code reader shown in FIG. 1b. The outgoing light beam 151 is generated in the reader unit 100 by a light source 158, usually a laser diode or the like. The light beam from light source 158 is optically modified by an optical assembly 157 to form a beam having certain characteristics. The beam sized and shaped by the assembly 157 is applied to a scanning unit 160. The light beam is deflected to the scanning unit 160 in a specific scanning pattern, i.e. to form a single line, a linear raster scan pattern, or more complex pattern. The scanned beam 151 is then directed by the scanning unit 160 through an exit window 159 to impinge upon a bar code symbol 170 disposed on a target a few inches from the front of the reader. In the embodiments in which the reader 100 is portable, the user aims or positions the portable unit so this scan pattern transverses the symbol 170 to be read. Reflected and/or scattered light 152 from the symbol is detected by a light detector 146 in the reader, producing electrical signals to be processed and decoded for reproducing the data represented by the bar code. As used hereinafter, the term "reflected light" shall mean reflected and/or scattered light.

The characteristics of each of the components 158, 157 and 160 may be independently controlled by drive units 110, 111 and 112 respectively. The drive units are operated by digital control signals sent over a control bus 126 by the central processing unit 140, which is preferably implemented by means of a microprocessor contained in the housing 155. Scanning may be initiated by a switch 130 (which may be trigger 154) connected to a read/start unit 129, which sends an appropriate signal to the CPU 140 to initiate the scanning process.

The output of the light detector 146 is applied to an analog amplifier 113 having an adjustable or selectable gain and bandwidth. An amplifier control unit 114 is connected to the analog amplifier 113 to effect the appropriate adjustment of circuit values in the analog amplifier 113 in response to control signals generated by the CPU 140 over the control bus 126.

One output of the analog amplifier 113 is applied to an analog-to-digital (A/D) converter 115 which samples the analog signal to be able to be tested by the CPU 140. The A/D converter is connected to the control bus 126 to transfer the sampled digital signal for processing by the CPU 140.

Another output of the analog amplifier 113 is applied to a digitizer 116. The digitizer 116 converts the analog signal from the analog amplifier 113 into a pulse width modulated digital signal. One type of digitizer is described in U.S. Pat. No. 4,360,798. Circuits such as those contained in digitizer 116 may have variable threshold levels which can be appropriately adjusted. The digitizer control unit 117 is connected to the digitizer 116 and functions to effect the appropriate adjustment of threshold levels in the digitizer 116 in response to control signals applied to the control unit 117 by the CPU 140 over the control bus 126.

The output of the digitizer 116 is applied to an edge detector 118. The operation of the edge detector 118 can be explained with reference to FIG. 1 of U.S. Pat. No. 5,396,053 which is hereby incorporated by reference and utilizes a similar block diagram and reference numerals to that presented here.

As noted above, the edge detector 118 is connected to the decoder 120, which functions in the manner described above. The decoded data is stored in a latch 121 which is connected to a data bus 122. The latch 121 is also connected to the control bus 126 which is also connected to the CPU 140. Decoded data is transferred over the bus 122 to an I/O controller 127, which formats the data into a communications packet, and is then applied to a connector 128 with which the cable 170 (shown in FIG. 1b) is connected. The CPU 140 also controls the display 149 and interacts with the keyboard 148 and memory 125.

Figure 3:
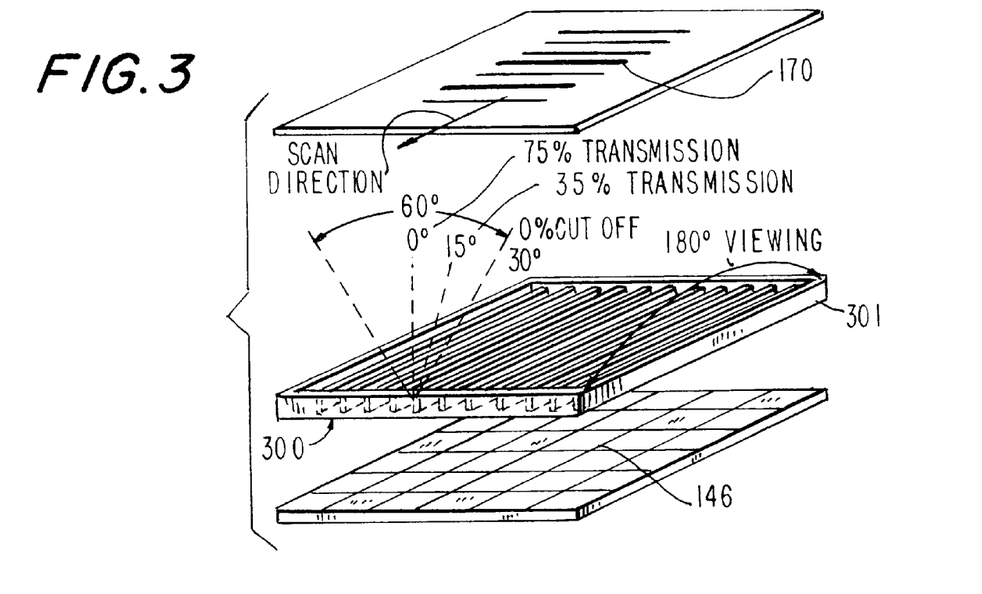
FIG. 3 is a perspective view of a louvered detector used in the bar code reader according to the present invention.

FIG. 3 is a perspective view of a louvered detector used in the bar code reader according to the present invention.

One of the key features of a light collection system according to the present invention is to implement a louver, or microlouver, film in front of a generally planar light detector 146 or sensor so that only reflected light directed along a narrow angular segment or spatial volume reaches the sensor. As shown in FIG. 3, a microlouver is an array of thin, elongated slats 301 formed from a thin plastic film 300 such as commercially available from the 3M Corporation under the name "Light Control Film" disposed over the planar light detector 146. The thin plastic film contains closely spaced black microlouvers. The film simulates a tiny venetian blind to shield out unwanted ambient light and direct display light from electronic instrumentation. This film is marketed by the 3M Corporation to enhance contrast of electronic displays or block nighttime windshield reflections from instrumentation. Reference is also made to U.S. Pat. No. 4,409,470, assigned to the common assignee, and subsequent divisions and continuations thereof noted in the "Reference to Related Applications" as disclosing a louver associated with a sensor in a bar code reader.

As depicted in FIG. 3, the film 300 permits 75% transmission at an angle normal to the planar surface of the detector 146, 35% transmission at an angle of 15° normal to the surface, and 0% transmission (cut-off) at an angle of 30° normal to the surface. The film 300 is oriented on the detector 146 so that the direction of the slats 301 is orthogonal to the direction of the bars in the bar code symbol 170 being scanned. Such an orientation will act as an "optical gain" filter by passing signals associated with a properly positioned bar code, and attenuating signals associated with text, background materials, or adjacent bar codes positioned in directions other than in the direction of scanning. The slats 301 may be colored to absorb light of an unwanted frequency range, and to strongly reflect laser light, e.g. red, scattered by the symbol 170.

Figure 4:
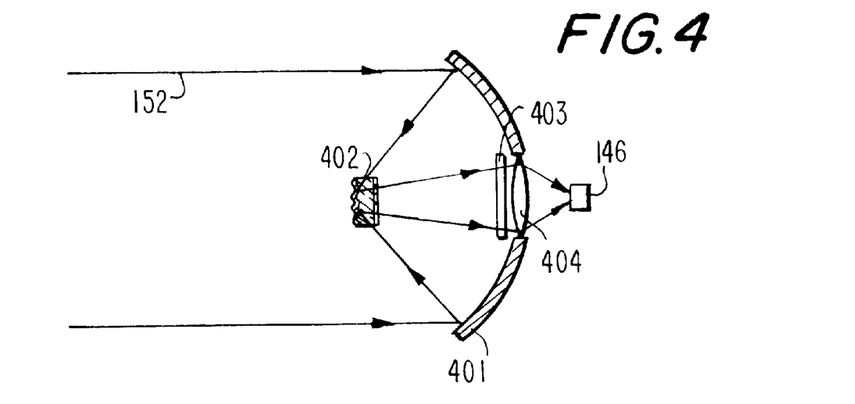
FIG. 4 is a simplified schematic representation of an imaging/diffusing light collection system according to the present invention.

FIG. 4 is a simplified schematic representation of another embodiment of an imaging/diffusing light collection system to collect the incoming reflected light 152. The reflected light 152 reflects from a concave collector mirror 401 onto a diffuser 402 which is illustrated in greater detail in FIG. 5. The reflected light 152 is then reflected from the diffuser 402 through a band pass filter 403, a positive lens 404 onto the photodiode detector 146. The advantage of such an arrangement is that a large field of view may be covered with a small detector (which has lower capacitance and noise than larger detectors). The design is compact because of the folded optical path, and the optical filter permits narrow bandwidth and small angle of incidence operation.

Figure 5:
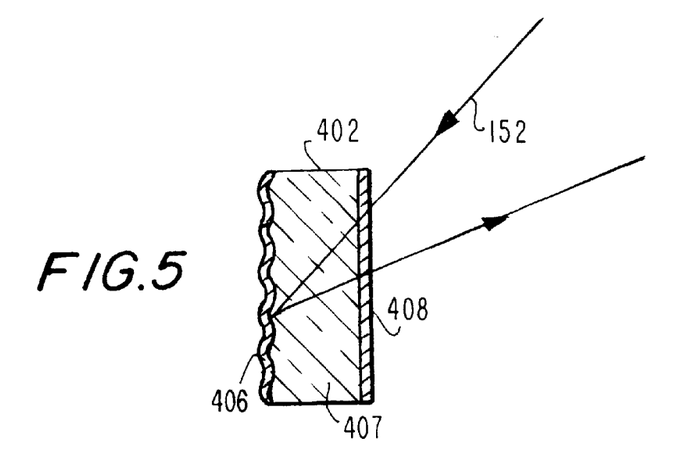
FIG. 5 is an enlarged view of the diffuser in the imaging/diffusing light collection system of FIG. 4.

FIG. 5 is an enlarged schematic representation of the diffuser 402 in the imaging/diffusing light collection system of FIG. 4 having a red plastic body 407, a gold coated corrugated surface 406 at the rear of the body 407 for reflection of the incoming reflected light 152, and an anti-reflective surface coating 408 at the front of the body 407.

Figure 6:
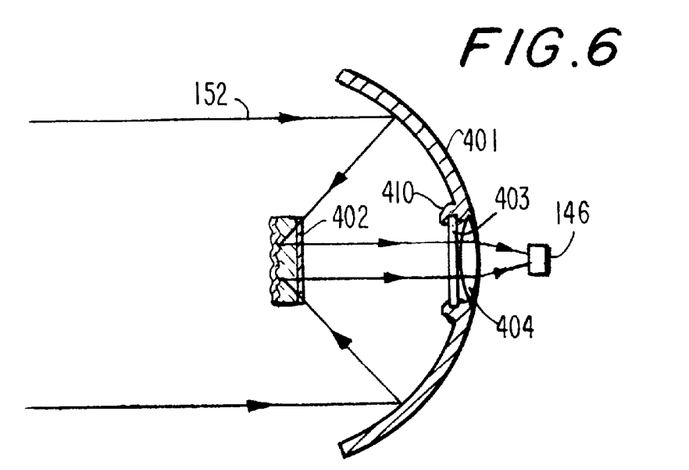
FIG. 6 is a simplified schematic representation of another imaging/diffusing light collection system according to the present invention.

FIG. 6 is a simplified schematic representation of another imaging/diffusing light collection system according to the present invention. The light collection portion of FIG. 6 is similar to that of FIG. 4, in which like elements are shown with like reference numerals. The mirror 401 has snaps 410 for holding the filter 403 in place. The lens 404 is integrally molded with the mirror 401.

Figure 7:
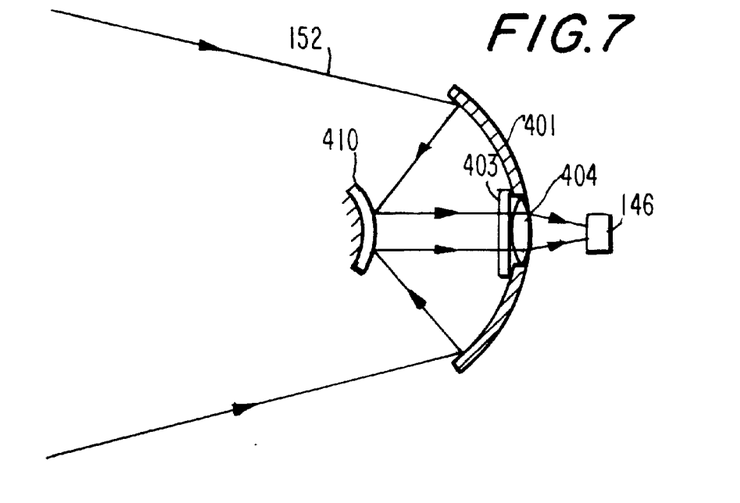
FIG. 7 is a simplified schematic representation of another imaging/diffusing light collection system according to the present invention.

FIG. 7 is a simplified schematic representation of another imaging/diffusing light collection system according to the present invention utilizing a convex mirror 410 in place of the diffuser 402 in the arrangement of FIG. 4. All other components remain the same.

Figure 8A:
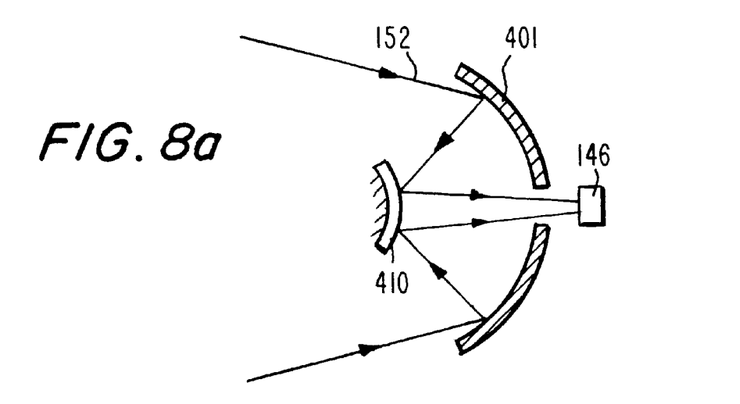
FIGS. 8a and 8b are simplified schematic representations of variations of the imaging/diffusing light collection system according to the present invention.
Figure 8B:
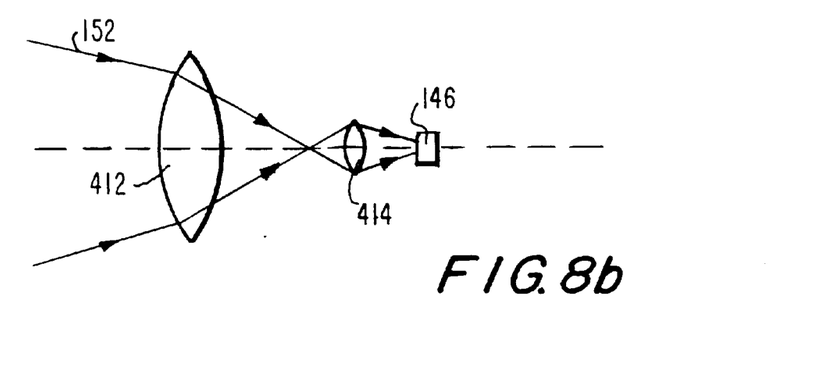

FIGS. 8a and 8b are simplified schematic representations of alternative imaging/diffusing light collection systems according to the present invention. FIG. 8a shows an arrangement with the concave collection mirror 401, the convex reflecting mirror 410, and the detector 146. The filter 403 and positive lens 404 were eliminated. FIG. 8b shows an arrangement with a first positive lens 412 collecting the reflected light 152, a second positive lens 414 coaxially optically aligned with the first lens 412, and the detector 146.

PREAMPLIFIER CIRCUITRY

In addition to the above-described optical configurations, the use of specialized preamplifier circuitry for processing the signal from the photodetector 146 is also within the scope of the present invention.

Figure 9:
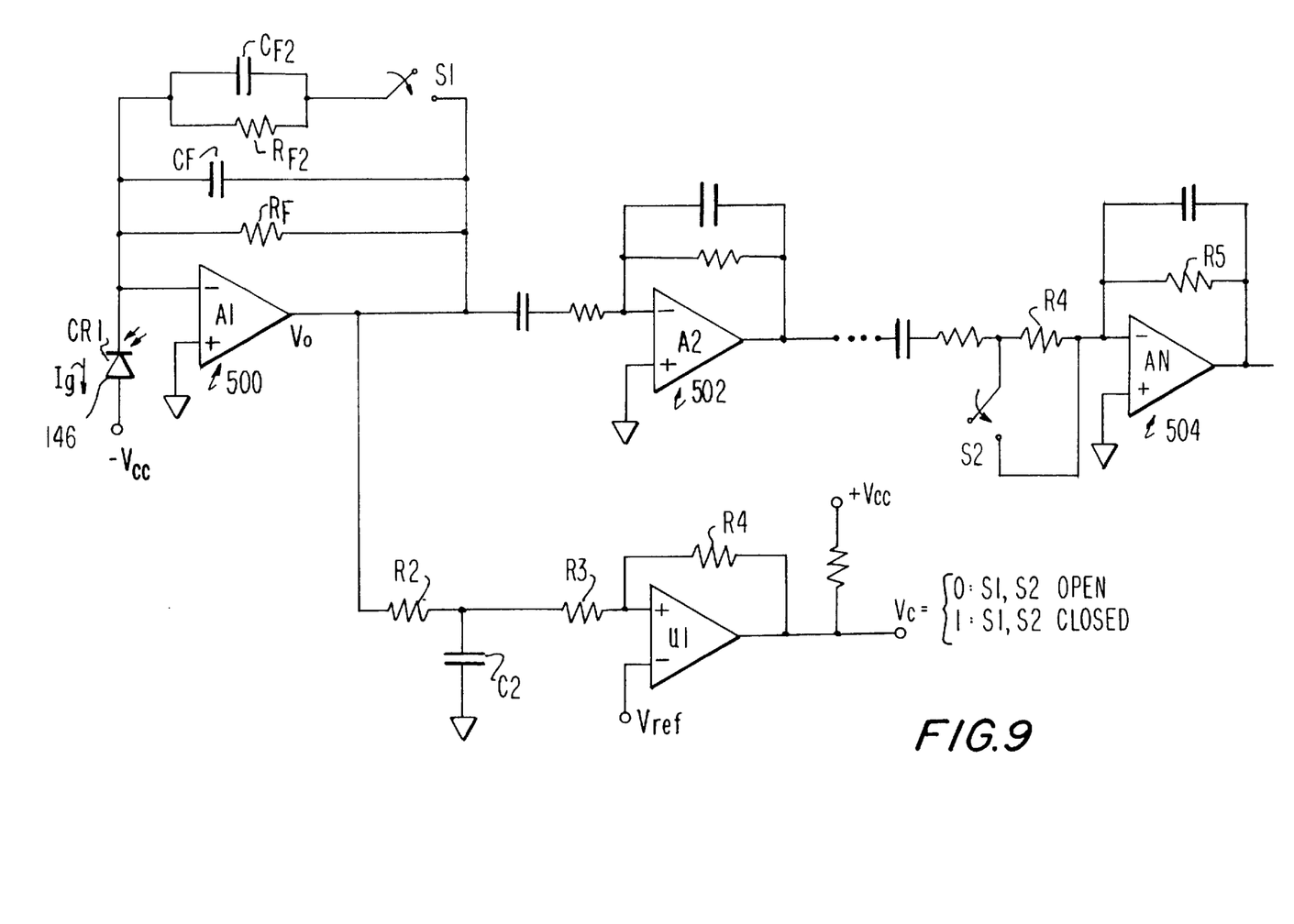
FIG. 9 is an electrical schematic diagram of a switched feedback network circuit according to the present invention.

FIG. 9 depicts the output of the photodetector 146 connected to a negative input of an amplifier $A_1$ of a first pre-amplifier stage 500. A resistor $R_F$ and a capacitor $C_F$ are connected in parallel across the negative input and the output of the amplifier $A_1$. A first switch S1 is connected in series with the parallel combination of a resistor $R_{F2}$ and a capacitor $C_{F2}$ across the negative input and the output of the amplifier $A_1$.

The output of amplifier $A_1$ is connected in series to a plurality of pre-amplifier stages, including a second pre-amplifier stage 502 having an amplifier $A_2$, and a final pre-amplifier stage 504 having an amplifier $A_N$. A series resistor $R_N$ is connected to the negative input of the amplifier $A_N$. A second switch S2 is connected across the resistor $R_N$.

The output of amplifier $A_1$ is also connected to a control feedback circuit consisting of a series resistor $R_2$, a parallel capacitor $C_2$, another series resistor $R_3$, and a control amplifier $U_1$. A resistor $R_4$ is connected across the positive input of amplifier $U_1$ and the output thereof. A reference voltage is applied to the negative input of the amplifier $U_1$.

The control amplifier $U_1$ generates an output voltage signal $V_C$ whose value is 0 when switches S1 and S2 are open, and whose value is 1 when switches S1 and S2 are closed. Thus, the position of the switches S1 and S2 is used to control the output voltage of the pre-amplifier circuit.

Figure 10:
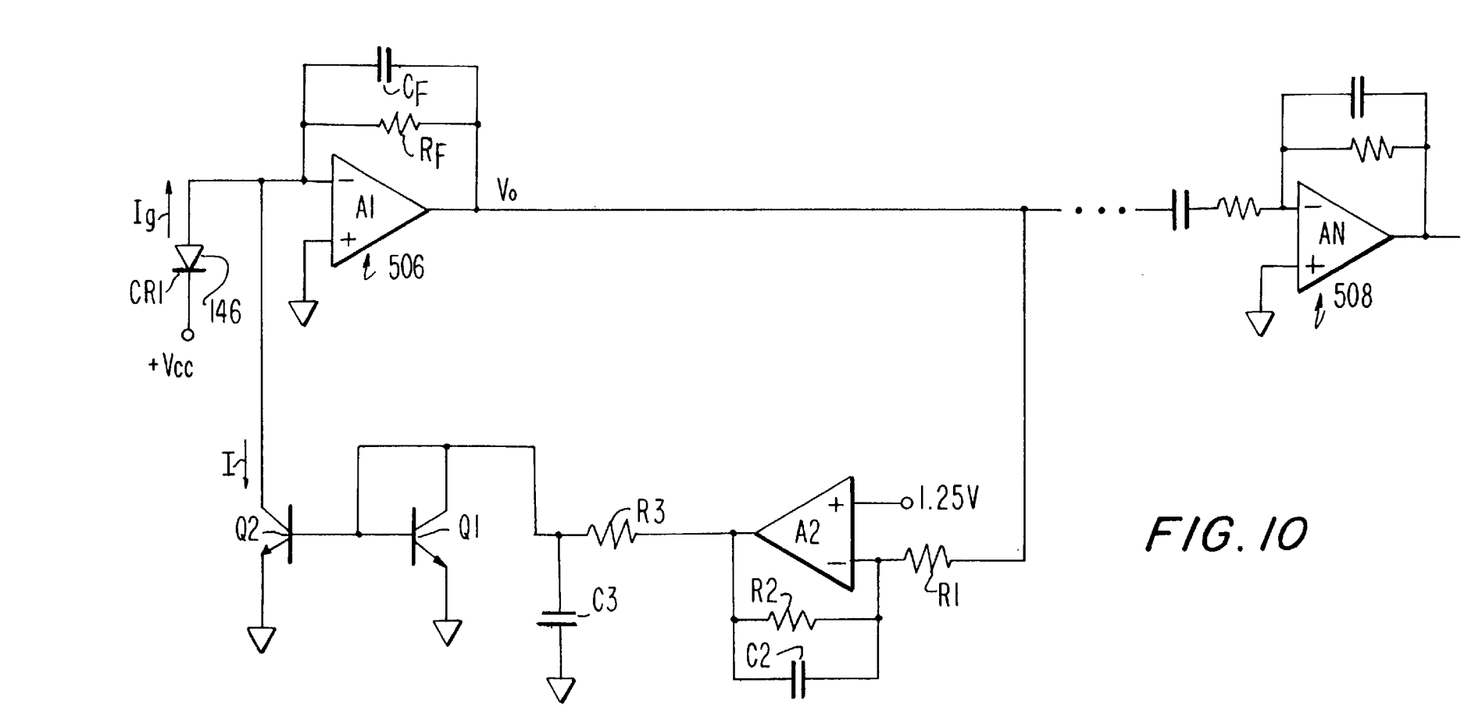
FIG. 10 is an electrical schematic diagram of a closed loop circuit according to the present invention.

FIG. 10 depicts a closed loop system for regulating the DC output voltage level of the pre-amplifier circuit. The output of the photodetector 146 is connected to the negative input of an amplifier $A_1$ of a first pre-amplifier stage 506. A resistor $R_F$ and a capacitor $C_F$ are connected in parallel across the negative input and the output of the amplifier $A_1$. The output of amplifier $A_1$ is connected in series to a plurality of pre-amplifier stages, including a final pre-amplifier stage 508 having an amplifier $A_N$.

The negative input of the amplifier $A_1$ is also connected to a pair of transistors $Q_1$ and $Q_2$ whose bases are interconnected as shown. The collector of transistor $Q_1$ is connected to ground via a capacitor $C_3$, and is connected to the output of another amplifier $A_2$ via a resistor $R_3$. A reference voltage is applied to the positive input of the amplifier $A_2$. A resistor $R_2$ and a capacitor $C_2$ are connected in parallel across the negative input and the output of the amplifier $A_2$. The negative input of the amplifier $A_2$ is connected via a resistor $R_1$ to the output of the amplifier $A_1$.

Figure 11:
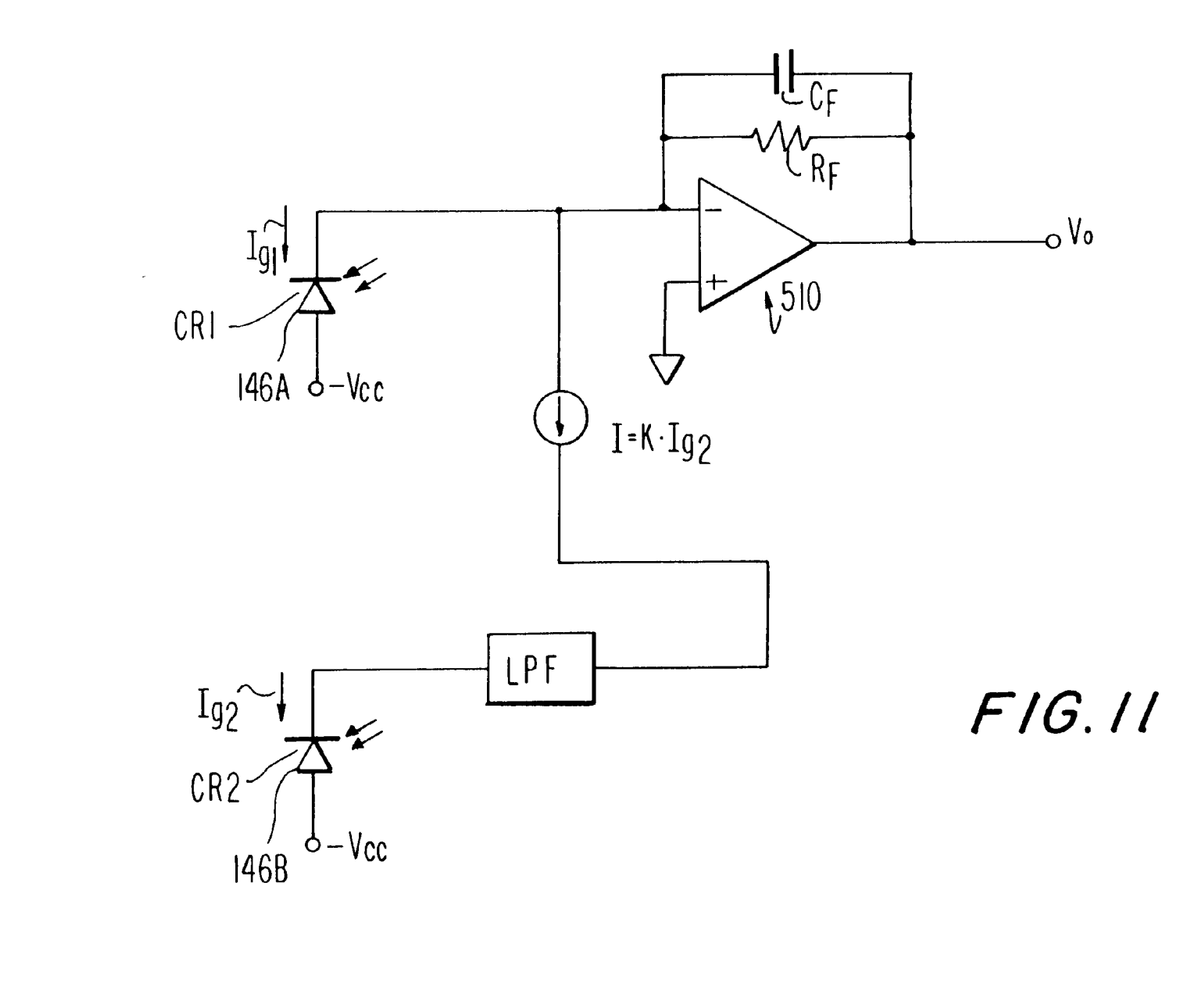
FIG. 11 is a dual photodiode implementation circuit according to the present invention.

FIG. 11 depcits a first photodetector 146A whose output is connected to a negative input of an amplifier $A_1$ of a first pre-amplifier stage 510, as well as a second photodetector 146B whose output is connected to the same negative input via a low pass filter 512. In this circuit, two or more photodetectors can be connected to a pre-amplifier circuit.

Although the present invention has been described with respect to reading one or two dimensional bar codes, it is not limited to such embodiments, but may also be applicable to more complex indicia scanning applications. It is conceivable that the method of the present invention may also find application for use with various machine vision or optical character recognition applications in which information is derived from other types of indicia such as characters or from the surface characteristics of the article being scanned.

In all of the various embodiments, the elements of the scanner may be assembled into a very compact package that allows the entire scanner to be fabricated as a single printed circuit board or an integral module. Such a module can interchangeably be used as the laser scanning element for a variety of different types of data acquisition systems. For example, the module may be alternately used in a hand-held scanner, a table top scanner attached to a flexible arm or a mount extending over the surface of the table or attached to the underside of the table top, or mounted as a subcomponent or subassembly of a more sophisticated data acquisiton system. Control or data lines associated with such components may be connected to an electrical connector mounted on the edge or external surface of the module to enable the module to be electrically connected to a mating connector associated with other elements of the data acquisition system.

An individual module may have specific scanning or decoding characteristics associated with it, e.g. operability at a certain working distance, or operability with a specific symbology or printing density. The characteristics may also be defined through the manual setting of control switches associated with the module. The user may also adapt the data acquisition system to scan different types of articles or the system may be adapted for different applications by interchanging modules on the data acquisition system through the use of the simple electrical connector.

The scanning module described above may also be implemented within a self-contained data acquisition system including one or more such components as a keyboard, display, printer, data storage, application software, and data bases. Such a system may also include a communications interface to permit the data acquisition system to communicate with other components of a local area network or with the telephone exchange network, either through a modem or an ISDN interface, or by low power radio broadcast from the portable terminal to a stationary receiver.

It will be understood that each of the features described above, or two or more together, may find a useful application in other types of scanners and bar code readers differing from the types described above.

While the invention has been illustrated and described as embodied in light collection systems in electro-optical readers, it is not intended to be limited to the details shown, since various modifications and structural changes may be made without departing in any way from the spirit of the present invention.

Without further analysis, the foregoing will so fully reveal the gist of the present invention that others can readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. An optical scanner, comprising:
    a light source for directing a light beam to a target having an indicium to be read;
    a sensor having a relatively small sensor area and a relatively large field of view, and operative for collecting reflected light from the indicium; and
    a light collection system including an optical diffuser positioned adjacent to the sensor so that reflected light from the relatively large field of view is collected and focused onto the relatively small sensor area.

2. In an electro-optical scanner for reading indicia, a light collection arrangement for collecting light reflected off the indicia en route to a photodetector, said arrangement comprising:
    a concave collecting reflector for focusing the reflected light along a first optical path at a focal point; and
    a light diffuser at the focal point for redirecting the reflected light along a second optical path toward and past the reflector to the photodetector.

3. The arrangement as defined in claim 2, wherein the diffuser has a front surface facing toward the reflector, and a corrugated, rear reflecting surface facing away from the reflector.

4. The arrangement as defined in claim 1; and further comprising an anti-reflective coating on the front surface of the diffuser.

5. The arrangement as defined in claim 2; and further comprising an optical filter and a convex lens in the second optical path.

6. The arrangement as defined in claim 3, wherein the filter is mounted on the reflector.

7. A light collection arrangement for collecting light reflected off indicia to be read by an electro-optical scanner, said arrangement comprising:
    a light reflector for receiving the light reflected off the indicia, and for directing the reflected light away from the reflector;
    a light diffuser for receiving the reflected light directed away from the reflector, and for redirecting the directed light back toward the reflector; and
    a light sensor for receiving the redirected light from the diffuser, and for generating an electrical signal indicative of the indicia.

8. The arrangement as defined in claim 7, wherein the reflector is a generally concave collecting mirror for focusing the light reflected off the indicia to a focal zone; and wherein the diffuser is located at the focal zone.

9. The arrangement as defined in claim 8, wherein the collecting mirror has an opening through which the redirected light passes.

10. The arrangement as defined in claim 9, wherein the collecting mirror has opposite sides, and wherein the diffuser and the sensor are located at the opposite sides of the collecting mirror.

11. The arrangement as defined in claim 9; and further comprising a focusing lens for focusing the redirected light onto the sensor.

12. The arrangement as defined in claim 11, wherein the lens is located at the opening of the collecting mirror.

13. The arrangement as defined in claim 11; and further comprising a light filter for filtering the redirected light prior to being received at the sensor.

14. The arrangement as defined in claim 13, wherein the filter is located adjacent the lens.

15. The arrangement as defined in claim 14, wherein the collecting mirror has a mount adjacent the opening, for holding the filter.

16. The arrangement as defined in claim 13, wherein the opening is centrally located on the collecting mirror, and wherein the lens is fixedly mounted in the opening, and wherein the filter is fixedly mounted in the mount adjacent the lens.

17. The arrangement as defined in claim 7, wherein the diffuser has a light-transmissive body having front and rear surfaces closer and farther, respectively, relative to the reflector.

18. The arrangement as defined in claim 17, wherein the closer front surface has an anti-reflective coating.

19. The arrangement as defined in claim 17, wherein the farther rear surface has a reflective coating.

20. The arrangement as defined in claim 17, wherein the farther rear surface is corrugated.

* * * * *